May 18, 1943. G. R. EGO 2,319,670
DIRECT COUPLED PLOW
Filed Jan. 9, 1941 4 Sheets-Sheet 1

INVENTOR
GEORGE ROSS EGO
BY A. S. Krotz
ATTORNEY

May 18, 1943. G. R. EGO 2,319,670
DIRECT COUPLED PLOW
Filed Jan. 9, 1941 4 Sheets-Sheet 2

INVENTOR
GEORGE ROSS EGO
BY
ATTORNEY

May 18, 1943.  G. R. EGO  2,319,670
DIRECT COUPLED PLOW
Filed Jan. 9, 1941  4 Sheets-Sheet 3

INVENTOR
GEORGE ROSS EGO
BY *A.S. Kirk*
ATTORNEY

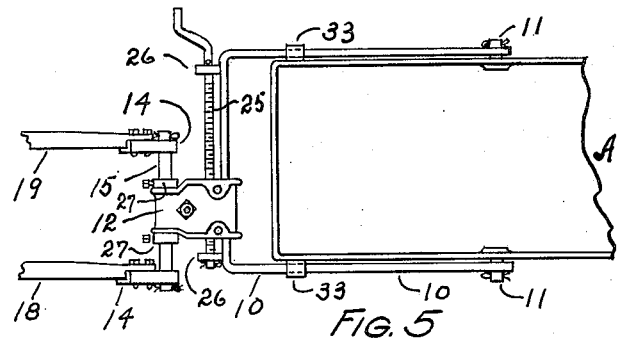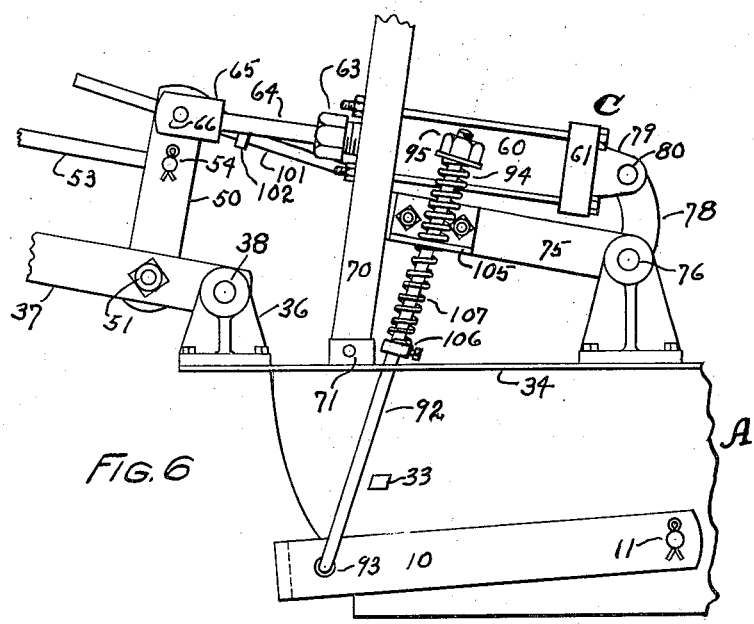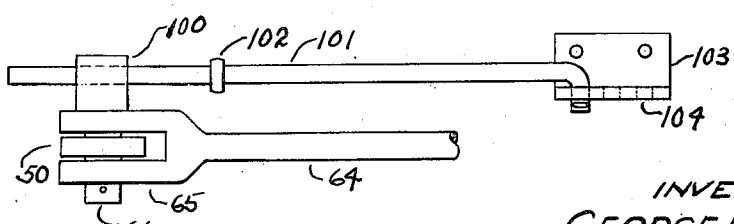

Patented May 18, 1943

2,319,670

UNITED STATES PATENT OFFICE 2,319,670

DIRECT COUPLED PLOW

George Ross Ego, Brantford, Ontario, Canada, assignor to Massey-Harris Company Ltd., Toronto, Ontario, Canada, a limited company of Canada Application January 9, 1941, Serial No. 373,730

8 Claims. (Cl. 97—47)

The present invention relates to plows which are adapted to be directly attached to tractors and are carried by the tractor when lifted out of the ground but when in the ground or in working position, the rear end of the plow may be carried by a rear furrow wheel.

An object of my invention is to provide a plow which will operate at various depths with the same down suck. In other words, the longitudinal level of the plow remains substantially the same at various depths.

Another object of the present invention is to provide means whereby the plows go into the ground point first and come out of the ground point first.

Another object of my invention is to provide a hitch which permits a limited amount of side swing of the plow so the tractor may be turned to the right or left without adding twisting or bending strains on the hitch.

A still further object of my invention is to provide means whereby the transverse position of the plow relative to the tractor is easily adjusted and whereby the transverse level of the plow, relative to the tractor, is easily adjusted.

Another object of the present invention is to provide means whereby the plow may be quickly and easily detached without removing the hitch and depth regulating means.

When my improved plow is out of the ground, it is carried entirely by the tractor. I provide means whereby when the plow is lowered and it does not enter the ground quickly, yielding pressure may be applied to the front ends of the plow so as to cause the plow to enter the ground point first, at which time the rear furrow wheel may not necessarily be in contact with the ground.

In the present invention, I provide means whereby the front end of the plow is lifted first so the plows may ride normally out of the ground. That is, so there is very little or no dirt left on the mould boards and shares when they leave the ground.

In the present invention, I provide preferably a hydraulic lift, the position of which is manually determined so as to fix the depth plowed.

I provide means whereby the front end of the plow may always be lifted to the same height regardless of the depth regulation by means of a fixed stop.

Generally state, the objects of my invention are to provide a direct connected plow which is easily attached and detached, easily controlled by the operator and capable of being operated at maximum efficiency.

To these and other useful ends, my invention consists of parts, combinations of parts, or their equivalents, and mode of operation, as hereinafter set forth and claimed and shown in the accompanying drawings in which:

Fig. 5 is a fractional top view illustrating the hitch and how the plow is attached thereto.

Fig. 6 illustrates a modification.

Fig. 7 illustrates the means used for limiting the lifting movement of the plow.

Figure 1:
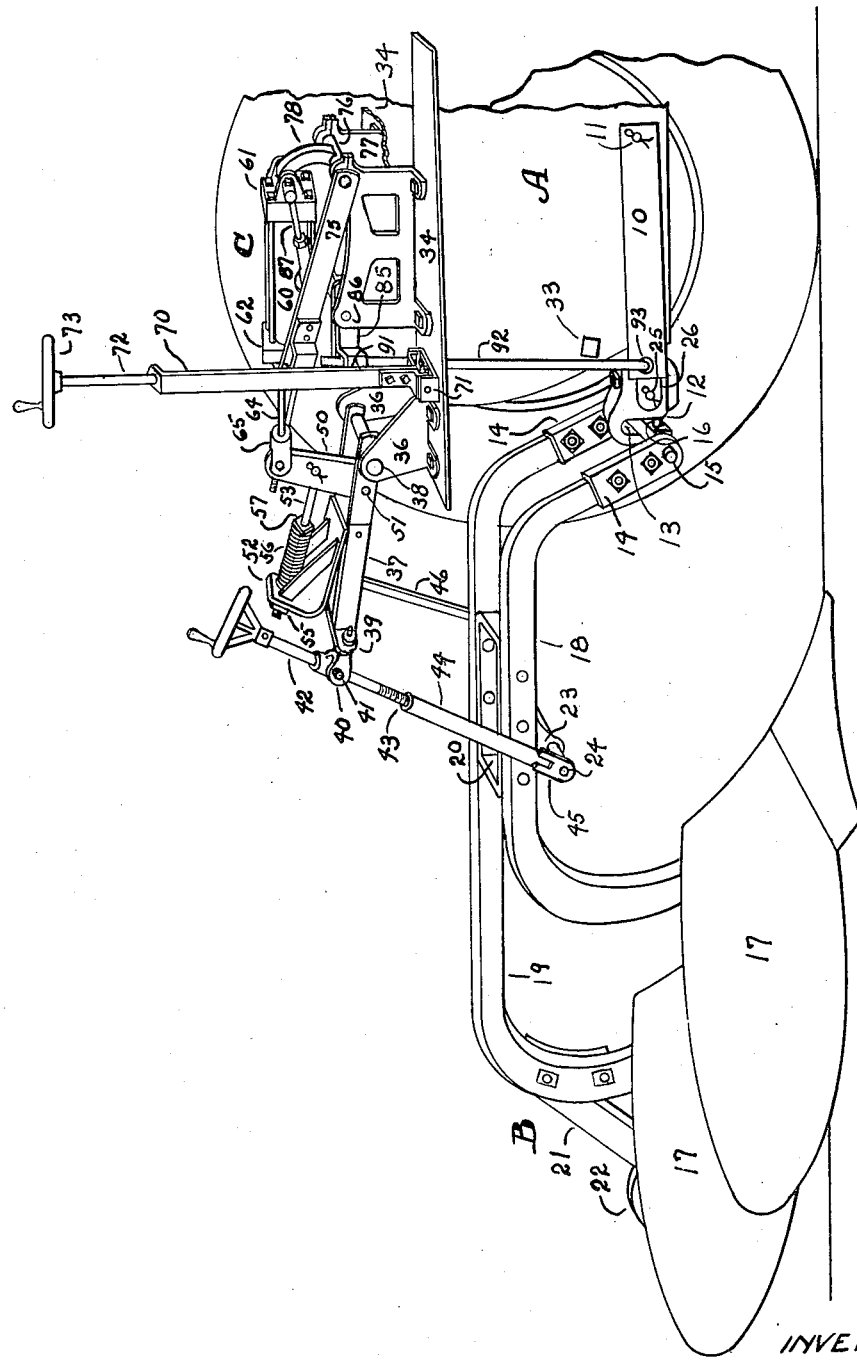
Fig. 1 is a perspective view of my direct coupled plow when in its operating position, illustrating a fraction of the tractor.

As thus illustrated, reference character A designates the tractor. Reference character B designates the plow in its entirety, less the depth regulating means and tractor hitch. Reference character C designates the plow lifting device in its entirety, less the secondary connections to the plow and depth regulating means.

Tractor A is provided with a U-shaped hitch 10 which is hingedly connected to opposite sides of the tractor frame as at 11. The transverse member of the hitch is provided with a hitch block 12 for supporting and regulating the transverse position of the front ends of the beams, as will hereinafter appear.

Member 12 is provided with an upwardly extending pocket 13. The front ends of the beams are provided with brackets 14—14, their lower ends being connected together by means of a bar 15. This bar extends through pocket 13 and is loosely held into the pocket by means of a bolt 16.

Member 15 is loose enough in pocket 13 to permit considerable tilting and some horizontal swinging movement so as to permit the plow to swing to the right or left or tilt sideways for a purpose which will hereinafter appear.

Member B comprises plow bottoms which are, in their entireties, designated by numeral 17, each being attached to a beam, the short beam being designated by reference numeral 18 and the long beam by reference numeral 19. These beams are suitably spaced at their front ends by bar 15 and medially by means of a bracket 20.

At the rear end of beam 19, I secure a bracket 21 which extends rearwardly and downwardly supporting at its free end a rear furrow wheel 22. It will be seen that member B will be pulled by hitch member 10 and that it is free to be tilted, or its rear end may swing to a limited extent to the right or left.

Bracket 20 is provided wtih downwardly projecting portions 23—23, (one not shown) through each of which shaft 24 extends, the purpose of which will hereinafter appear.

Referring now to Figure 5. Block 12 is slidably mounted on the transverse portion of member 10. This block may be clamped to member 10 by means of bolts in any desired position or means may be provided for manually moving the block as follows:

A cranked shaft 25 is rotatably mounted on brackets 26—26 and has a screw thread between these brackets which engages a threaded opening in block 12. Clearly by turning the crank, block 12 may be moved in either direction. Adjustable collars 27—27 provide means for fixing the transverse position of member 12 on member 15.

I provide stop blocks 33—33 which are suitably secured to the body of the tractor and on opposite sides thereof and adapted to limit the upward movement of member 10 for a purpose which will hereinafter appear.

Tractors are usually provided with floor or fender boards 34. These boards generally extend a distance in rear of the frame of the tractor. I mount on members 34 spaced brackets 36—36 (see figures 1 and 2) to which the front end of frame 37 is pivotally mounted as at 38. Member 37, at its rear end, extends in opposite directions, as at 39—39 (one not shown) each having a pivotally mounted forked bracket 40. The right hand bracket carries a block (not shown) having outwardly projecting pins 41 which extend through ears on member 40, answering as a pivot for the block.

I provide a shaft 42 which rotatably extends through the block and having fixed collars which engage the block on opposite sides so shaft 42 will be carried by member 37 but is free to be turned by the operator by means of a crank or a hand wheel as illustrated.

The lower end of shaft 42 is screw threaded as at 43 into a sleeve 44, the sleeve being pivotally mounted at its lower end to a bracket 45 which is rotatably carried on the end of shaft 24. Bracket 40 on the other end of member 39 is provided with a link 46 which forms a connection to the other end of shaft 24 similar to that shown. It will be seen that by raising and lowering member 37 on its hinge 38, the plow will be raised and lowered on member 15 as an axis and that by turning shaft 42, the relative distance between member 39 and beam 18 may be changed, thus to tilt member B to the right or left.

I pivotally mount an upwardly extending arm 50 on member 37 as at 51. A bracket 52 is preferably welded to member 37 and has an operating connection to member 50 as follows:

A rod 53 is hingedly mounted on member 50 as at 54 and extends rearwardly freely through an opening in bracket 52, member 53 having a nut or collar 55 so when member 50 is moved forward, member 37 will be raised on its pivot 38.

I provide preferably a spring 56 and a nut 57 whereby when member 50 is moved rearwardly and the downward movement of member B is obstructed, a yielding down pressure is provided on the plow.

Member C comprises a cylinder 60, the front end being provided with an end closure 61, the rear end closure 62 having a stuffing box 63 through which a piston rod 64 extends. A piston head is provided at the front end of rod 64 which is adapted to move forwardly and rearwardly in cylinder 60.

The rear end of piston rod 64 is provided with a forked bracket 65 which is pivotally mounted to the upper end of member 50, as at 66. By applying pressure in the rear end of cylinder 60, the plow will be lifted and when this pressure is released, the plow will be permitted to drop to a working position. By applying pressure in the front end of cylinder 60, member 50 may be caused to yieldingly force the plow down to its working position.

An advantage of the above recited design is that if the plow bottom strikes a stone or excessive obstruction, it may lift against spring 56, the spring acting to immediately force the plow back into its working position.

Figure 2:
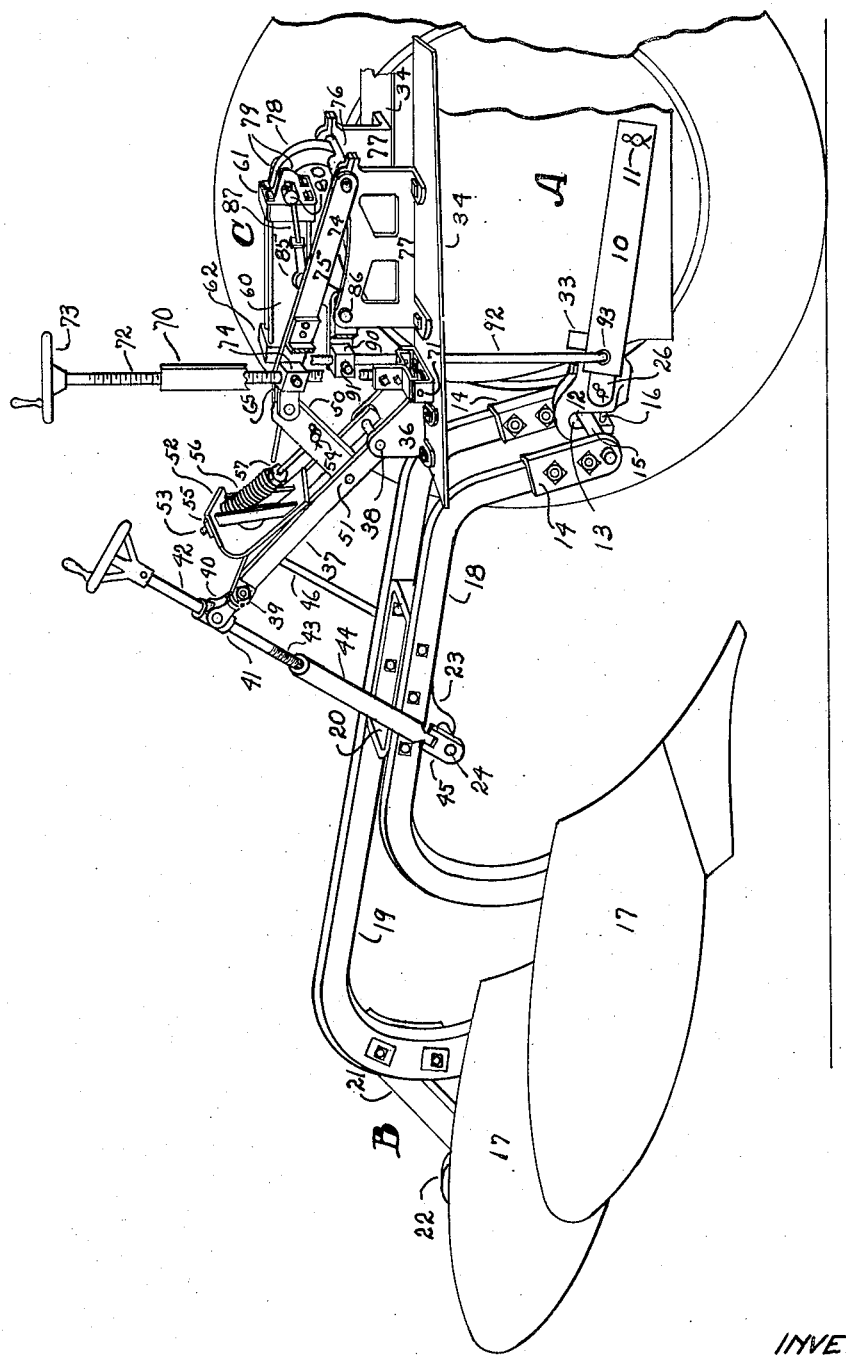
Fig. 2 is a similar view to Figure 1, except illustrating the plow in its lifted position.

Because of the fact that the front end of the plow is lighter than the rear end, when the lifting mechanism is operated to lift the plow, the front end only will be raised because of pivot 11 until member 10 engages stop 33 (see Figure 2). Clearly the plow will come out of the ground point first, and if the ground is hard and difficult to penetrate, when the plow is moved into the ground, the pressure of spring 56 may act to force the front end of the beams down and cause the plows to enter the ground point first.

Figure 3:
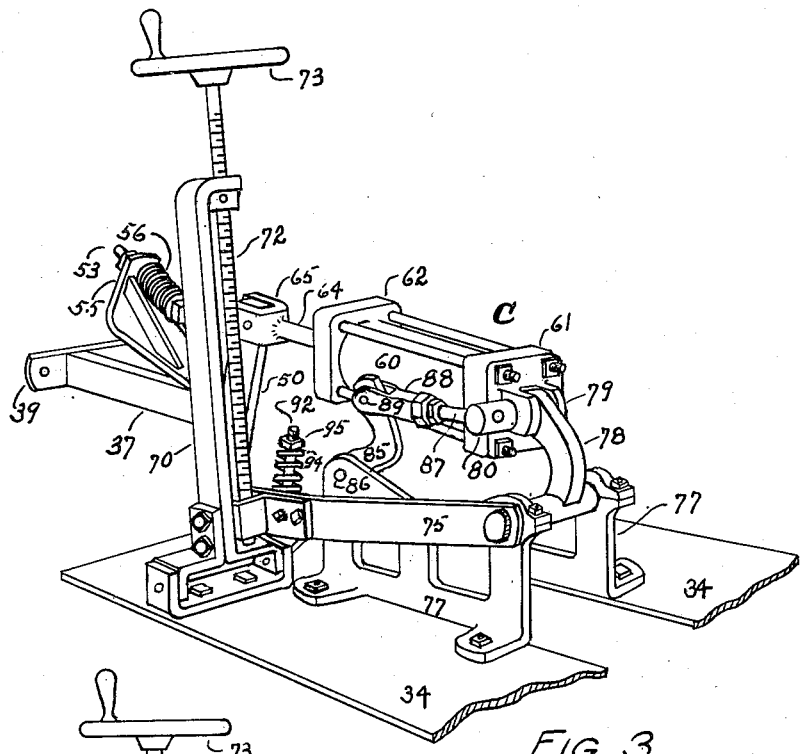
Figures 3 and 4 are enlarged views, illustrating the power lifting and depth regulating means and a fraction of the running boards of the tractor to which the device is attached.
Figure 4:
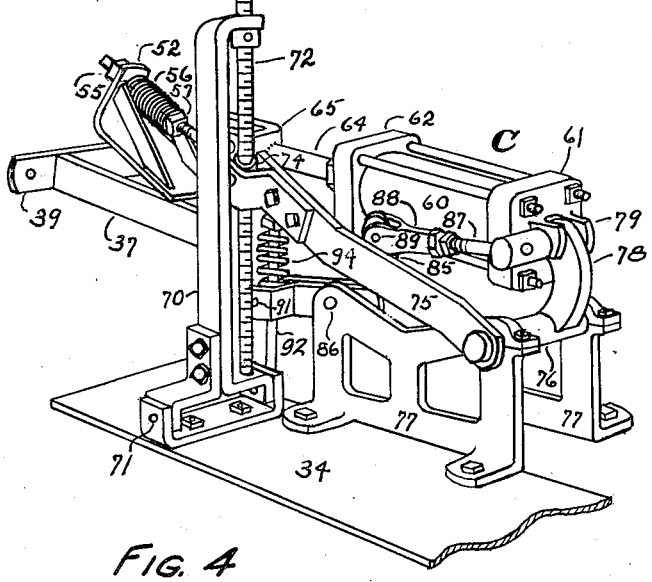

I provide means for regulating the depth of the plow as follows:

A post 70 is pivotally mounted on member 34 as at 71 as illustrated. I provide a screw threaded shaft 72 which is pivotally mounted in post 70, as clearly illustrated in Figure 4 and is provided at its upper end with a cranked wheel 73, as illustrated in Figures 3 and 4.

A screw threaded nut 74 operatively engages shaft 72 (see Figure 4) and is transversely pivotally mounted in the free end of arm 75. Arm 75 is rigidly attached to a shaft member 76, the shaft member being hingedly mounted in brackets 77, the brackets being secured to members 34, as illustrated. Shaft 76 is provided with an upwardly extending arm 78 thus forming a bell crank.

Member 61 is provided with rearwardly extending ears 79—79 which are hingedly secured to the upper end of member 78 by means of the reduced end of member 80. It will be seen that when shaft 72 is turned by the operator, nut 74 will be moved vertically and carries with it arm 75 which movement will determine the longitudinal position of member C; thus to regulate the position of frame 37 and the vertical position of the plow, particularly when the plows are in operating position.

It will be understood that suitable means is provided for creating hydraulic pressure having a valve (not shown) within easy reach of the operator, whereby piston rod 64 will be moved into and out of member 60.

Thus far I have described the manner of operating the power lifting device and in turn how the vertical position of shaft 24 is determined. I provide means for controlling the vertical position of the front ends of the beams as follows:

A bell crank 85 is pivotally mounted on the rear end of brackets 77 as at 86, the forward end of the bell crank being operatively connected to member 80 by means of a ling 87 and a forked bracket 88, the forked bracket being adjustably connected to member 87, as illustrated, and the rear end being pivotally connected to bell crank 85, as at 89. When member C is rocked forwardly or rearwardly, by turning member 72 the rear end of bell crank 85 will be raised and lowered, this rear end being forked and carrying between its ends a block 90 which is pivotally carried by the fork as at 91.

I provide a link 92 which is hingedly connected to the rear end of hitch member 10, as at 93, the upper end being preferably slidably mounted in block 90 and having mounted on its upper end a spring 94 (see Figures 3 and 4). The upper end of link 92 is screw threaded and carries a nut 95 whereby the lowest position of member 92 relative to member 90 may be determined (see Figures 3 and 4).

It will be seen that when the plow is in operating position, the position of the rear end of hitch 10 will be determined by the position of bell crank 85 therefore when crank wheel 73 is turned to regulate the depth of the plow, the body of the plow will be moved vertically, the connections being designed whereby the longitudinal position of the plow will remain constant regardless of the depth being plowed.

In Figure 1, I illustrate plow B as being in an operating position, thus the weight of the plow will be carried by piston rod 64 and link 92. When pressure is applied in the rear end of cylinder 60, piston 64 will be caused to move forward and the forward end of the plow will be lifted until member 10 contacts members 33; thus the plow will be caused to come out of the ground point first at the time when the rear end of the plow is largely carried by wheel 22.

When bar 10 contacts stops 33, a further movement of piston rod 64 will lift the rear end of the plow bodily and clearly if the pressure in member 60 is released, piston rod 64 will move rearwardly and the rear end of the plow will first drop until wheel 22 contacts the ground. A further rearward movement of piston rod 64 will then permit the plow points to enter the ground and if the shares do not readily enter the ground, pressure in the front end of cylinder 60 will force a further downward movement sufficient to cause the points of the plows to enter the ground until link 92 has reached its lowest position as determined by spring 94.

It will be seen that when the plow is lifted, it will come out of the ground point first and when lowered, it will be caused to go into the ground point first, and that by regulating nut 95 on the upper end of link 92, the working position of the front ends of the beams, relative to the rear, may be adjusted so as to add or reduce the down suck of the plow. Clearly the regulating of the plow depth by turning wheel 73 will not materially change the downsuck of the plow.

In devices of the class, when the working position of the plow is adjusted by turning wheel 73, it will change the lifted position of the plow. I provide means for definitely defining this lifted position independent of the working position as follows:

Member 66 is provided with an extension 100 (see Figure 7). A rod 101 is slidably mounted in this extension, the rod having a flange 102 adapted to limit the forward movement of member 100, thus to limit the lifted position of the plow, regardless of the working position.

Rod 101 is anchored to a bracket 103 which in turn is secured to the frame of the tractor. The front end of the rod is bent at right angles and is adapted to pass through one of a number of closely spaced apertures 104; thus the lifted position of the plow may be determined by the position of the rod in member 103.

Referring now to Figure 6 wherein parts similar to the parts in the other figures are designated by like numerals. In this design, I eliminate a number of parts by supplying arm 75 with a bracket 105 and extend link 92' loosely through this bracket. Link 92' will be controlled directly by arm 75 instead of indirectly through the members eliminated. In either design, it will be seen that the front ends of the beams are, at all times, free to lift until member 10 contacts members 33.

I may elect to supply link 92' with a collar 106 and a spring 107 so the front end of the beams are yieldingly held into working position. Spring 107 however is light enough to permit the front end of the beams to raise before the rear end of the plow raises, as heretofore described.

Clearly the connections between piston rod 64 and member 24 may be differently designed without in any way affecting the operation of the device. For example, spring 56 may be dispensed with and bracket 50 locked rigidly to frame 37.

Member C is provided with the usual pump and valve (not shown) for creating hydraulic pressure and for controlling the liquid passage into and out of either end of cylinder 60.

Clearly many minor detail changes may be made in the various parts of my device, without departing from the spirit and scope of the invention, as recited in the appended claims.

Having thus shown and described my invention, I claim:

1. A device of the class described, comprising a tractor adapted to pull a plow and having mounted thereon a raising and lowering mechanism, said raising and lowering mechanism having spaced transverse operating connections to said plow midway its length and having means whereby the plow may be tilted sidewise relative to the tractor, a separate connection between the body of said raising and lowering mechanism to the front end of said plow, manually operated means adapted to move said raising and lowering mechanism to thereby define the working position of said plow.

2. A device of the class described, comprising a tractor and a direct connected type plow and means forming an operating connection therebetween, said means comprising a draw bar frame being transversely hinged at its front end to the tractor and connected at its rear end to the front end of the plow by means of a universal joint, stops secured to said tractor a distance above the working position of the rear end of said draw bar frame adapted to limit the upward movement thereof, a power lifting device having transversely spaced lifting connections to opposite sides of said plow and forward of the center of gravity thereof, whereby when said lifting device is operated to lift the plow, the front end of said plow will first be lifted until said draw bar frame contacts said stops, after which the rear end of said plow will be lifted clear of the ground, one of said spaced connections having means for manually controlling its length.

3. A device as recited in claim 2 including; a manually controlled connection to the rear end of said draw bar frame adapted to determine the working height thereof.

4. A device as recited in claim 2 including;

manually operated means forming a connection between the rear end of said draw bar frame and said power lifting device adapted to determine the working position of the rear end of said draw bar relative to the lifting device.

5. A device of the class described, comprising a tractor and a plow, raising and controlling means forming operating connections between the tractor and plow, said raising and controlling means comprising a hitch hingedly connected at its forward end to the tractor and having at its rear end a universal joint connection to the front end of the plow, a power lift having a connection to said plow forward of the center of gravity thereof and having means whereby the plow may be tilted transversely relative to the tractor, manually operated means forming a connection between said power lift and the rear end of said hitch adapted to raise or lower the rear end of said hitch while in an operating position to thereby define the operating depth of the plow without operating said power lift.

6. A device of the class described, comprising a tractor and a direct coupled type plow and means forming an operating connection therebetween, said means comprising a draw bar frame being hingedly mounted at its front end to the tractor and being connected at its rear end to the front end of the plow by means of a universal joint, a power lift mounted on the tractor having a connection to the plow forward of the center of gravity thereof and having means whereby the plow may be manually tilted transversely relative to the tractor, manually operated means forming a stop for the down movement of the rear end of said hitch frame to thereby define the operating depth of the plow, whereby when said power lift is operating to lift the plow, its front end is first lifted to a predetermined height and then the rear end is lifted clear of the ground.

7. A device as recited in claim 6 including; means whereby the rear end of said hitch is free to lift independent of said power lift and a stop adapted to limit the upward movement of said hitch.

8. A device as recited in claim 6 including; said universal joint being manually transversely adjustable on the rear end of said hitch.

GEORGE ROSS EGO.